United States Patent [19]
Rutherford et al.

[11] Patent Number: 5,454,530
[45] Date of Patent: Oct. 3, 1995

[54] CANARD ROTOR/WING

[75] Inventors: John W. Rutherford, Scottsdale, Ariz.; Matthew O'Rourke, Newport News, Va.; William R. McDonnell, St. Louis, Mo.; Brian T. Smith, Everett, Wash.

[73] Assignee: McDonnell Douglas Helicopter Company, Mesa, Ariz.

[21] Appl. No.: 68,907

[22] Filed: May 28, 1993

[51] Int. Cl.⁶ .......................... B64C 27/22; B64C 39/12
[52] U.S. Cl. ................... 244/7 A; 244/6; 244/22; 244/8; 244/45 A
[58] Field of Search ................... 244/6, 7 R, 7 A, 244/8, 12.5, 12.6, 22, 23 B, 45 A, 73 R

[56] References Cited

U.S. PATENT DOCUMENTS

| | | | |
|---|---|---|---|
| 2,879,013 | 3/1959 | Herrick | 244/7.1 |
| 4,469,294 | 9/1984 | Clifton | 244/23 B |
| 4,589,671 | 5/1986 | Ramme et al. | 244/6 |
| 4,711,415 | 12/1987 | Binden | 244/6 |
| 4,730,795 | 3/1988 | David | 244/6 |
| 4,896,846 | 1/1990 | Strom | 244/12.5 |

*Primary Examiner*—Andres Kashnikow
*Assistant Examiner*—Virna Lissi Mojica
*Attorney, Agent, or Firm*—Donald E. Stout; John P. Scholl; Roger C. Turner

[57] ABSTRACT

A dual-mode high speed rotorcraft is disclosed which combines the efficiency of a helicopter with the high-speed capability of a fixed wing aircraft. The rotorcraft includes a rotor for propulsion during low-speed flight and hover, which is stopped and locked to function as a fixed wing during a high-speed flight. Also included are a canard and a high-lift tail, which together function to provide substantially all of the lift for the rotorcraft during the transition between low and high-speed flight, so that the rotor may be unloaded while starting and stopping.

14 Claims, 4 Drawing Sheets

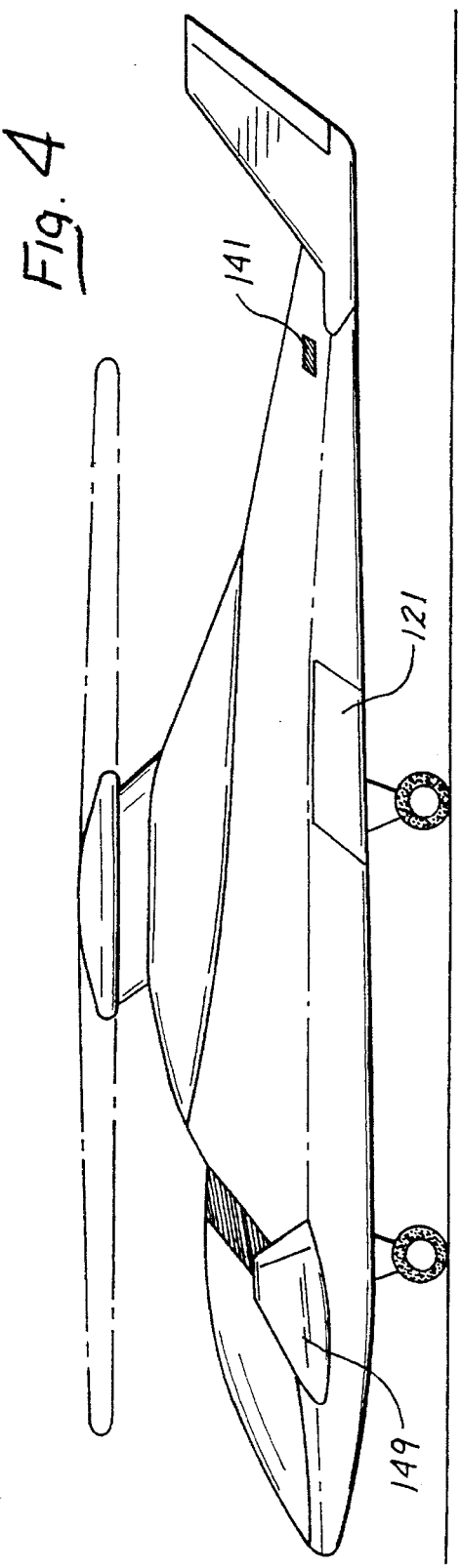
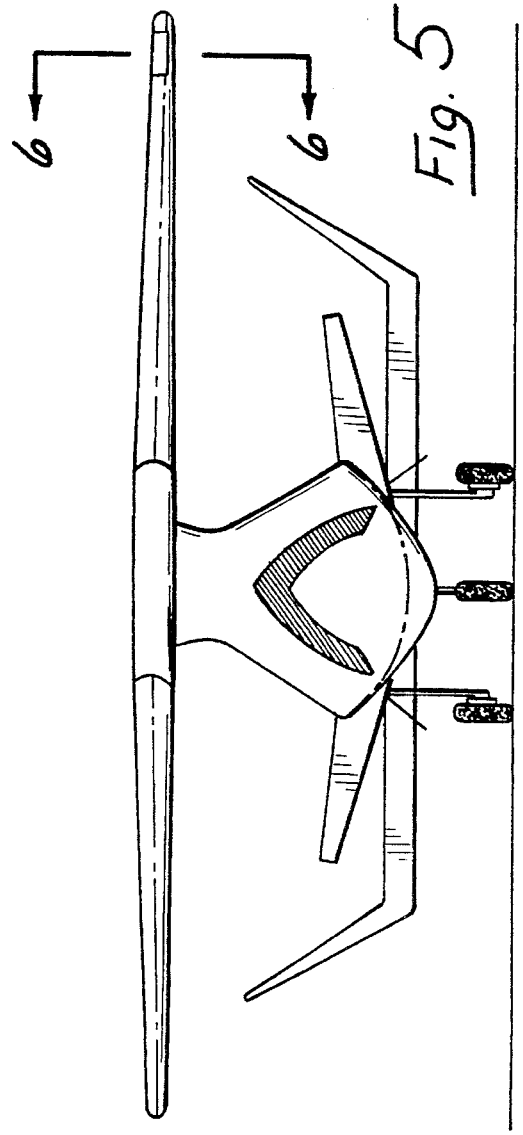

5,454,530

CANARD ROTOR/WING

BACKGROUND OF THE INVENTION

This invention relates to an aircraft, and more particularly to a dual-mode aircraft being capable of operating in both a helicopter and fixed wing mode of flight.

The history of manned flight is replete with attempts to develop an aircraft capable of hovering like a helicopter, converting to a fixed wing aircraft, and cruising at high subsonic speeds. A successful, efficient design would have great utility because of its suitability for a large number of diverse missions, as well as its ability to take off and land from a very small, remote airfield. Past concepts of this type include the Herrick convertiplane, which used a rotating wing in autogyro mode for lift. This idea envisioned stopping and starting the main rotor using the energy available from the moving air as is the case with a traditional autogyro. It also had a fixed wing for additional lift during the conversion process. This concept was unable to hover or fly vertically because the rotor was not powered.

Another concept of this type, known as the Rotor/Wing (U.S. Pat. No. 3,327,969), was similar in that it was capable of hover, vertical and translational flight using a rotor consisting of a large centerbody with three stub blades. The powered rotor enable flight as a helicopter. The large centerbody was sized to provide the necessary lift during conversion to fixed-wing flight as the rotor slowed and stopped rotating. Once stopped and locked, the rotor became a wing. The sequence for conversion included pitching the aircraft nose down in helicopter flight while accelerating to conversion speed. Once this speed was achieved, the pilot pitched the aircraft nose up and entered autogyro mode. This provided an angle of attack necessary for the large centerbody to support the aircraft. At the speed in which all the lift was carried by the centerbody, the rotor was stopped and locked. The centerbody and stub blades then became a fixed wing. This concept heavily compromises the efficiency in helicopter mode due to the high induced power required with the stub blades and the efficiency in fixed-wing mode due to the large wing area associated with the large centerbody.

What is needed, therefore, is a dual mode aircraft which successfully combines the efficiency of a helicopter with the high-speed capability of a fixed wing aircraft, and is capable of smoothly, efficiently, and safely converting from one flight mode to another. The aircraft should be capable of hovering, vertical flight, and translational flight in an efficient manner.

SUMMARY OF THE INVENTION

This invention solves the problem outlined above by disclosing a dual mode aircraft which is a high-speed rotorcraft combining the efficiency of a helicopter with the high-speed capability of a fixed wing, aircraft. The aircraft comprises a fuselage having a hub located on an upper surface thereof, with a plurality of rotor blades extending radially from the hub. The aircraft has a first flight regime during which the hub is rotated by at least one engine, thereby rotating the rotor blades and permitting the aircraft to fly vertically, hover, and fly translationally at relatively low speed, and a second flight regime during which the hub is locked to prevent rotation, with the rotor blades being positioned to function as fixed wings, thereby permitting the aircraft to fly translationally at relatively high speed. The aircraft further comprises a canard which is mounted on the fuselage forwardly of the rotor/wing. The aircraft converts to fixed-wing mode by stopping the rotating main wing which then locks into a fixed position and acts like a conventional wing.

The claimed invention is a great improvement over the previous concepts in the prior art, particularly that of U.S. Pat. No. 3,327,969, because of the ability to remove the centerbody of the rotor/wing in the prior art devices and replace it with a canard and lifting tail configuration. The rotor consists preferably of two blades. This feature reduces the total wing area required for conversion by replacing the inefficient lifting centerbody with more efficient lifting surfaces. Furthermore, the total reduction in lifting area reduces both skin friction drag and induced drag. Additionally, the inventive configuration removes the conversion lift requirements from the rotating frame, eliminating any possibility of center of lift oscillation feeding into the vehicle dynamics. Using the canard and horizontal tail surfaces allows a smoother conversion feature, removing the requirement of pitching the aircraft nose up into autogyro mode to convert. As the aircraft accelerates in helicopter flight, the rotor is off loaded, making conversion possible directly from a compound helicopter attitude. Flying as a compound helicopter, with the rotor unloaded reduces rotor induced vibration as forward speed increases. The "true rotor" reduces the disk loading compared to the prior art Rotor/Wing's annulus loading, making the environment under the vehicle more benign. This also significantly reduces the induced power required in hover. Efficiency in fixed-wing flight increases due to the reduced lifting area associated with this concept. An additional capability which differs from the Rotor/Wing of the prior art is the ability to vary the sweep of the wing once it is stopped. This allows efficient low-speed airplane flight with a high aspect ratio wing. High-speed flight is achieved by rotating the wing into an oblique position to delay the drag divergence Mach number.

The above mentioned and other objects, features, and advantages of the invention and the manner of obtaining them will become apparent, and the invention itself will be best understood, by reference to the following description taken in conjunction with the accompanying illustrative drawings.

BRIEF DESCRIPTION OF THE DRAWINGS

FIG. 4 is a left side plan view of the aircraft shown in FIG. 2;

FIG. 5 is a front plan view of the aircraft shown in FIG. 2; and

FIG. 6 is a cross-sectional view taken on line 6—6 of FIG. 5, showing the propulsion duct within the rotor/wing.

DESCRIPTION OF THE PREFERRED EMBODIMENT

Figure 1:
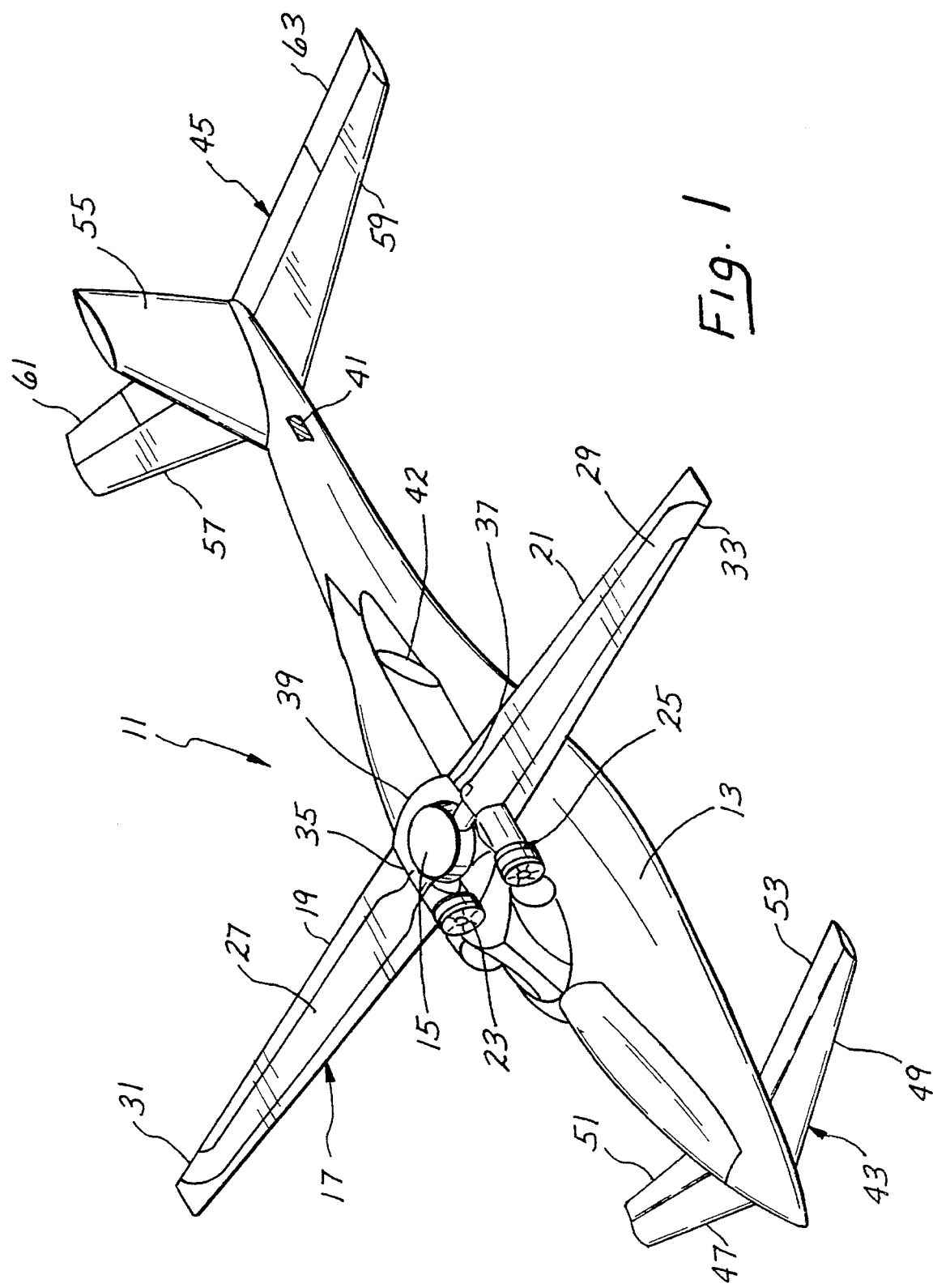
FIG. 1 is a perspective diagrammatic view of one embodiment of a dual mode aircraft constructed in accordance with the teachings of this invention, with certain external fuselage parts and the rotor/wing skins removed to show internal elements.

FIG. 1 shows a dual mode aircraft or rotorcraft 11, capable of flight in both rotating rotor and fixed wing configurations. The aircraft 11 includes a fuselage 13, on which is rotatably mounted a rotor hub 15. Attached to the hub 15 is a rotor/wing 17, which is comprised of two blades 19 and 21 in the preferred embodiment. The leading and trailing edges of the blades 19 and 21 are symmetrical in configuration, permitting the rotor/wing 17 to operate effectively irrespective of flow direction. The aircraft is powered by a pair of low bypass turbofan engines 23 and 25. The rotor blades 19 and 21 each contain a flow duct 27 and 29, respectively, within the blade structure. The flow ducts 27 and 29 serve to transport exhaust gases from the engines 23 and 25 to exit nozzles 31 and 33 located in the tips of each of the rotor blades 19 and 21, respectively, when the aircraft is in its rotating rotor configuration.

In order to control aircraft flight in the rotating rotor configuration, the rotor hub 15 is of the gimbaled/teetering type in order to allow flapping degrees of freedom. Additionally, feathering hinges 35 and 37 permit changing of the pitch of each rotor blade 19 and 21, respectively, as with a conventional helicopter. The rotor controls consist of cyclic and collective pitch controllers contained within an aerodynamic hub fairing 39. These provide control of the aircraft in helicopter flight. Yaw control is achieved through conventional helicopter control devices, such as a tail rotor, fenestron, or a thruster, shown as element 41. Any of these devices are equally appropriate, depending upon the application desired for the aircraft. Since little antitorque control is required due to use of the reaction drive through the tip nozzles 31 and 33, these devices are rather small and use relatively small amounts of power.

In the fixed wing, horizontal flight configuration, the ducts 27 and 29 are shut off, and the exhaust gases from engines 23 and 25 are diverted aft to exit from conventional nozzles 42. There are preferably two such nozzles, but any number could be employed. The aircraft employs a canard 43 and a horizontal tail 45 for controlling flight in the fixed wing configuration. The canard 43 has a flight surface 47 and 49 extending from each side of the fuselage 13, forwardly of the rotor/wing 17. The trailing edge of each flight surface 47 and 49 is comprised of high lift flaperons 51 and 53, respectively. The horizontal tail 45 is conventional with respect to other fixed wing aircraft, and includes a vertical tail portion 55 as well as two horizontal flight surfaces 57 and 59 extending from each side of the fuselage 13, rearwardly of the rotor/wing 17. Each of the flight surfaces 57 and 59 includes a high lift flaperon 61 and 63, respectively.

FIGS. 2 through 6 show a slightly modified embodiment of the aircraft shown in FIG. 1, which is identical in all respects with that of FIG. 1 except as described and shown herein. Each of the elements in FIGS. 2 through 6 corresponding to equivalent elements in FIG. 1 are designated by the same reference numeral, preceded by the numeral 1. This modified embodiment is designed for use in higher speed applications than the FIG. 1 embodiment. One notable modification is that the canard 143 has a smaller span and is more swept than in the FIG. 1 embodiment, consistent with use in higher speed applications. Additionally, the canard 145 is modified in this embodiment to be of a one piece construction, and to eliminate the vertical tail portion 55 of FIG. 1. Instead, generally vertical portions 165 and 167 are incorporated on the ends of the horizontal tail element 145.

Figure 2:
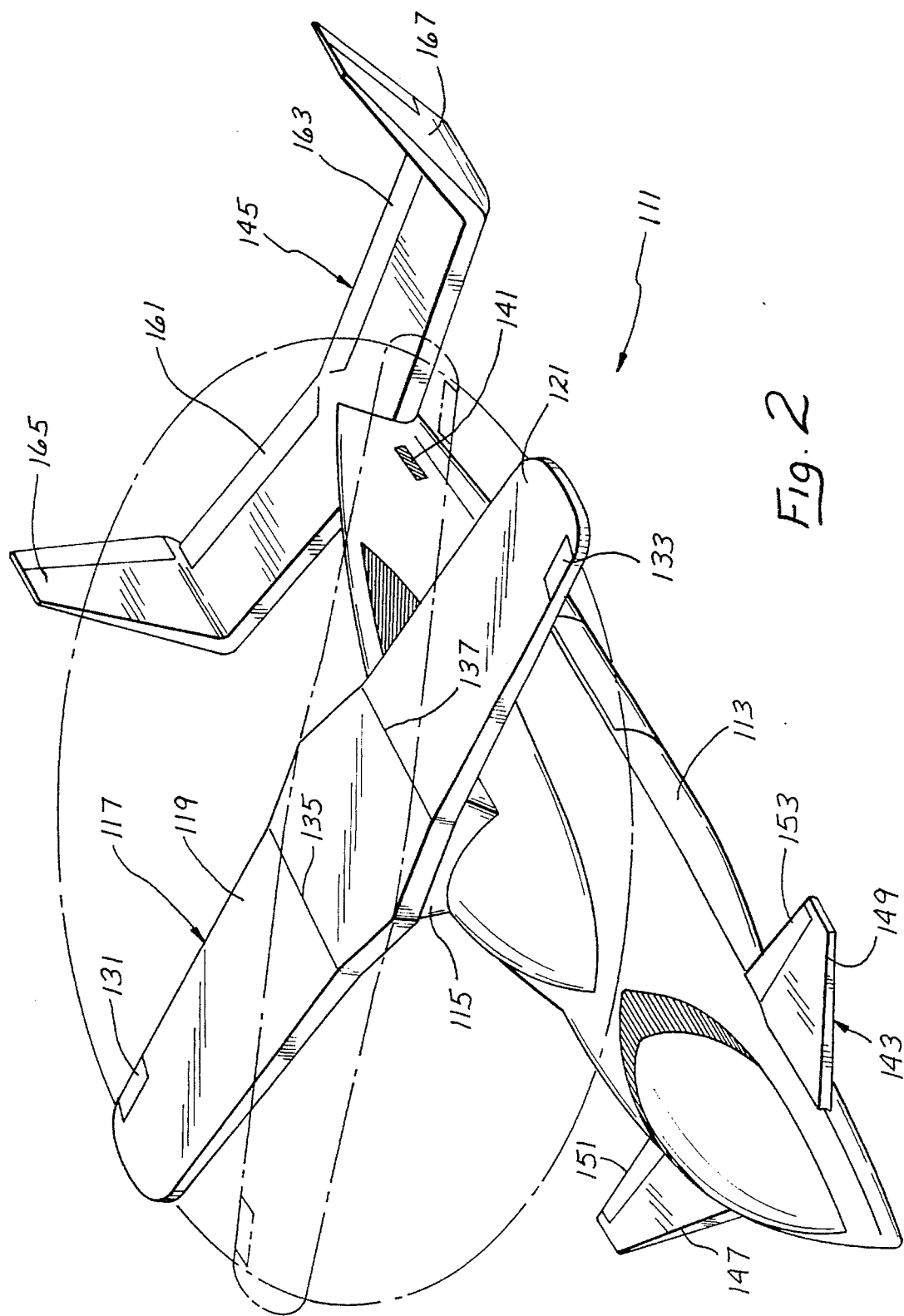
FIG. 2 is a perspective view of a modified embodiment of the inventive dual mode aircraft.
Figure 3:
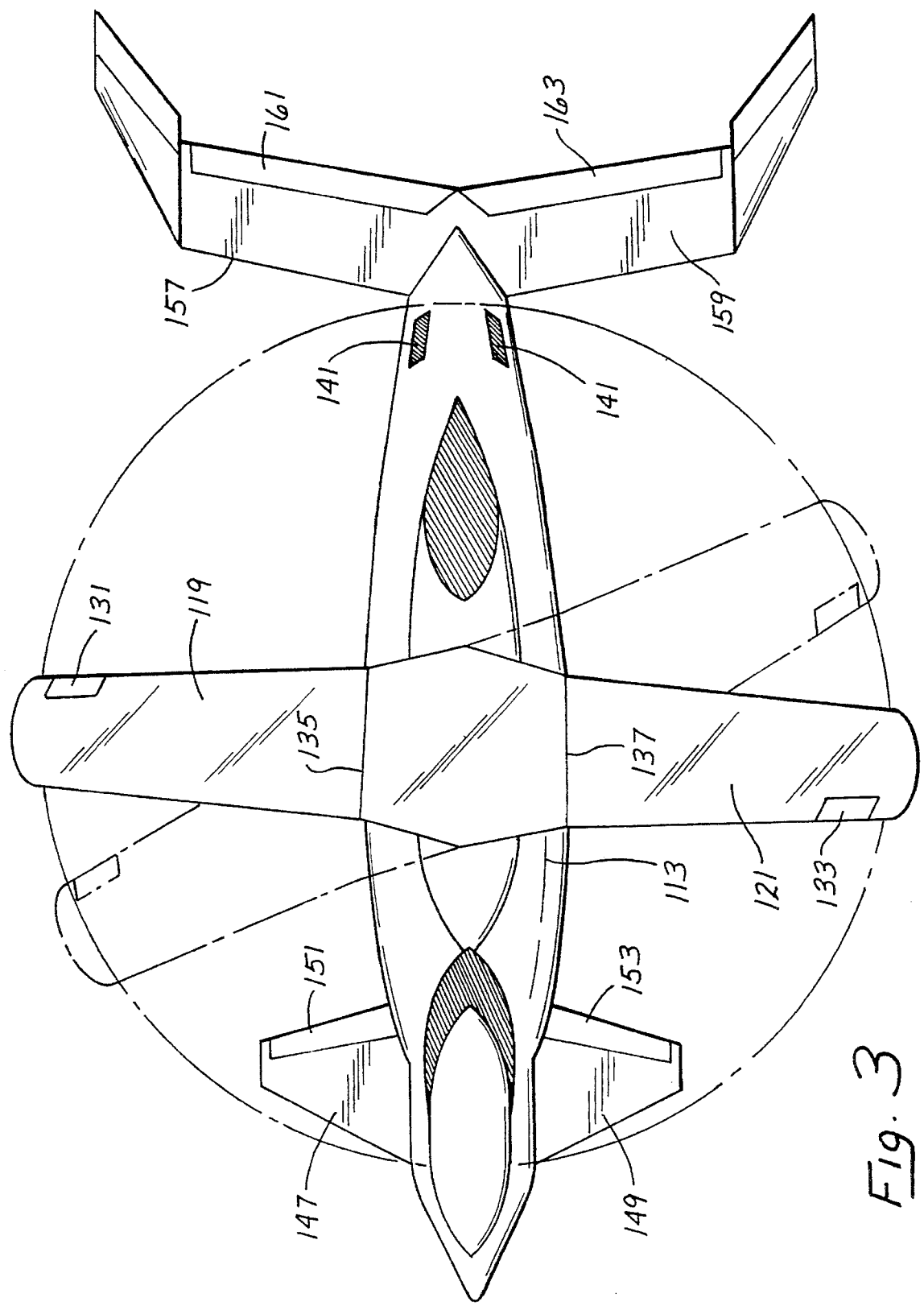
FIG. 3 is a top plan view of the aircraft shown in FIG. 2, illustrating fixed and rotating positions of the rotor/wing.

Both of the aircraft embodiments shown in FIGS. 1 and 2 operate substantially identically, and the description provided below is equally applicable to either embodiment, though for the sake of simplicity only the FIG. 1 reference numerals will be identified. The dual mode aircraft 11 operates like a helicopter for vertical take off. In this mode, exhaust gases from the engines 23 and 25 flow through the rotor blade passages 27 and 29, exiting from tip nozzles 31 and 33 to thereby drive the rotor/wing 17 rotationally about the hub 15. Because of the use of this type of reaction drive, the need for conventional transmission and antitorque systems is eliminated, though conventional drives could be employed if desired. During rotary-wing flight, the rotor/wing 17 acts like a conventional helicopter rotor. As noted above, flight is controlled by means of the gimbaled/teetering hub 15 and the feathering hinges 35 and 37 for controlling the pitch of the rotor blades using conventional cyclic and collective pitch control mechanisms, with yaw control being provided by nozzles 41 on each side of the fuselage. When the aircraft reaches a suitable altitude, appropriate control adjustments are made to begin translational (horizontal) flight in the helicopter mode. Alternatively, the aircraft may continue to hover like a helicopter indefinitely.

The rotorcraft converts into fixed wing mode by transitioning from a pure helicopter to a compound helicopter at about 60 knots. At this speed, the canard 43 and the horizontal tail 45 begin to assume the lift requirements of the aircraft. As this occurs, the rotor/wing 17 is gradually unloaded, relieving it of lift and propulsive requirements. As the speed of the craft continues to increase, this shift of lift continues, and the engine exhaust gases are increasingly diverted by a diverter valve means or the like through the conventional nozzles 42 to provide thrust in the manner of a typical jet aircraft. Simultaneously, the gimbal degree of freedom of the hub is reduced through variable dampers (not shown). At the conversion speed, which is approximately 120 knots for the preferred embodiment, the rotor/wing 17 is completely unloaded with the ducts 27 and 29 being shut off and all of the engine exhaust gases passing through the nozzles 42. The gimballing freedom is then locked, the rotor/wing 117 stopped and locked to the fuselage 13, and the feathering hinges 35 and 37 locked out such that the rotor/wing 17 becomes fixed to the fuselage 13 in the manner of a conventional wing.

In fixed wing flight, the configuration operates as a fixed wing aircraft using conventional airplane controls, except that roll control is achieved through differential deflection of the flaperons 51, 53, 61, and 63 on both the canard 43 and the tail 45. The cruise lift is shared between the rotor/wing 17, the canard 43, and the horizontal tail 45 to minimize induced drag. The high aspect ratio of the rotor/wing 17 further improves the cruise efficiency of this configuration. In order to increase the flight Mach number at which compressibility effects become significant, the rotor/wing 17 can be rotated about the hub by a locator motor (not shown) up to a range of about 45 degrees, so that the wing resides in an oblique configuration, providing sweep for the rotor/wing 17. This feature significantly increases the speed capability of the configuration while providing substantial mission flexibility.

The invention described and claimed herein is useful for various applications. It has application for all missions requiring vertical takeoff and hover capability. It is also suitable for military transport, attack, scout, and liaison missions. It could be used as a Navy aircraft operating from smaller ships other than aircraft carriers. Additionally, this aircraft could easily be adapted as a remotely piloted vehicle (RPV) with various military and commercial applications. Commercially, it would be a useful transport aircraft, particularly as a commuter or general aviation/business aircraft. The concept of low disk loading and high-speed capability make this aircraft more attractive than previous high-speed rotorcraft concepts.

Although an exemplary embodiment of the invention has been shown and described, many changes, modifications, and substitutions may be made by one having ordinary skill in the art without departing from the spirit and scope of the invention. Therefore, the invention is not to be limited except by the scope of the claims.

What is claimed is:

1. An aircraft capable of both helicopter-type flight and fixed wing flight, comprising:

a fuselage;

a rotor/wing comprising a hub located on an upper surface of said fuselage and a plurality of rotor blades extending radially from said hub, said aircraft having a first flight regime during which said hub is rotated by at least one engine, thereby rotating said rotor blades such that they provide lift to enable the aircraft to fly vertically, hover, and fly translationally at relatively low speed, and a second flight regime during which said hub is locked to prevent rotation, with the rotor blades being positioned to provide aerodynamic lift as fixed wings, thereby permitting the aircraft to fly translationally at relatively high speed; and a canard mounted on the fuselage forwardly of the rotor/wing;

wherein said aircraft transitions in flight from said first flight regime to said second flight regime, the aircraft entering an intermediate flight regime during the transition between said first and second flight regimes, during which the canard provides lift to the aircraft, thereby enabling the rotor/wing to be unloaded in order that said rotor blades may be locked into their fixed wing configuration.

2. An aircraft as recited in claim 1, wherein said aircraft further comprises a generally horizontal tail.

3. An aircraft as recited in claim 1, wherein each said rotor blade has an exhaust duct contained therein and an outlet nozzle fluidly communicating with said duct on the tip end of said rotor blade, said exhaust duct fluidly communicating with said at least one engine such that when said aircraft is in the first flight regime, exhaust gases from said engine flow through each said exhaust duct and exit through each said tip nozzle, thereby creating reaction thrust sufficient to rotate said rotor/wing and provide propulsion to said aircraft.

4. An aircraft as recited in claim 3, wherein when said aircraft is in the second flight regime, the exhaust gases from said at least one engine are diverted from said rotor blade exhaust ducts, and flow through generally axially oriented exhaust ducts which fluidly communicate with at least one rearwardly oriented exhaust nozzle, the exhaust gases exiting through said rearwardly oriented exhaust nozzle thereby propelling said aircraft in a forward direction.

5. An aircraft as recited in claim 1, wherein when said aircraft is in the second flight regime the fixed rotor blades may be rotated about said hub to one of a plurality of orientations, ranging from an orientation laterally transverse to said fuselage to a swept orientation which permits flight at relatively higher velocities.

6. An aircraft as recited in claim 1, wherein said canard includes an airfoil section having a trailing edge, the trailing edge including a high lift device thereon.

7. An aircraft as recited in claim 2, wherein said horizontal tail includes an airfoil section having a trailing edge, the trailing edge including a high lift device thereon.

8. An aircraft as recited in claim 6, wherein said high lift device comprises a movable flaperon.

9. An aircraft as recited in claim 7, wherein said high lift device comprises a movable flaperon.

10. An aircraft as recited in claim 2, wherein during said intermediate flight regime, both said canard and said horizontal tail surface together provide substantially all of the lift to the aircraft.

11. An aircraft as recited in claim 10, wherein the hub is of the gimballing teetering type for providing the rotor blades with flapping degrees of freedom during the first flight regime, said hub being locked during the transition regime by gradually reducing the gimbal degree of freedom of said hub using variable damping means.

12. An aircraft as recited in claim 1, and further comprising at least one feathering hinge attaching said rotor blades and said hub, whereby the pitch of said blades may be changed as desired during flight in the first flight regime.

13. An aircraft as recited in claim 1, wherein substantially all of the aerodynamic lift for the aircraft during said intermediate flight regime is provided by lifting surfaces other than said rotor/wing.

14. An aircraft as recited in claim 1, wherein substantially all of the aerodynamic lift for the aircraft during said intermediate flight regime is provided by lifting surfaces which are located either forwardly or aft of said rotor/wing.

* * * * *